(12) United States Patent
Suslov

(10) Patent No.: US 9,215,420 B2
(45) Date of Patent: Dec. 15, 2015

(54) RANKING SEARCH RESULTS

(75) Inventor: Sergei Suslov, Rockville, MD (US)

(73) Assignee: Comcast Cable Communications, LLC, Philadelphia, PA (US)

(*) Notice: Subject to any disclaimer, the term of this patent is extended or adjusted under 35 U.S.C. 154(b) by 825 days.

(21) Appl. No.: 13/115,641

(22) Filed: May 25, 2011

(65) Prior Publication Data

US 2011/0296463 A1 Dec. 1, 2011

Related U.S. Application Data

(60) Provisional application No. 61/350,185, filed on Jun. 1, 2010.

(51) Int. Cl.

| | |
|---|---|
| *G06F 3/00* | (2006.01) |
| *G06F 13/00* | (2006.01) |
| *H04N 5/445* | (2011.01) |
| *H04N 7/173* | (2011.01) |
| *G06F 17/30* | (2006.01) |
| *H04N 21/2187* | (2011.01) |
| *H04N 21/475* | (2011.01) |
| *H04N 21/482* | (2011.01) |

(52) U.S. Cl.
CPC ............ *H04N 7/173* (2013.01); *G06F 17/3053* (2013.01); *H04N 21/2187* (2013.01); *H04N 21/4755* (2013.01); *H04N 21/4826* (2013.01); *H04N 21/4828* (2013.01)

(58) Field of Classification Search
CPC ............ H04N 21/4332; H04N 21/482; H04N 21/4821; H04N 21/4825; H04N 21/4826; H04N 21/4828
USPC ............................ 707/725; 725/37, 38, 39, 53
See application file for complete search history.

(56) References Cited

U.S. PATENT DOCUMENTS

| | | | | |
|---|---|---|---|---|
| 7,036,138 | B1* | 4/2006 | Tash ................................ | 725/46 |
| 8,127,329 | B1* | 2/2012 | Kunkel et al. .................. | 725/41 |
| 2002/0144264 | A1* | 10/2002 | Broadus .......................... | 725/39 |
| 2006/0026635 | A1 | 2/2006 | Potrebic et al. | |
| 2006/0259944 | A1* | 11/2006 | Tash .............................. | 725/135 |
| 2007/0074245 | A1 | 3/2007 | Nyako et al. | |
| 2007/0283392 | A1* | 12/2007 | Tsusaka et al. ................ | 725/47 |
| 2008/0027921 | A1 | 1/2008 | Chandrasekar et al. | |
| 2008/0271078 | A1* | 10/2008 | Gossweiler et al. ........... | 725/40 |
| 2009/0204991 | A1 | 8/2009 | White et al. | |
| 2010/0293579 | A1* | 11/2010 | Kulick et al. ................... | 725/49 |
| 2011/0107374 | A1* | 5/2011 | Roberts et al. ................. | 725/46 |

FOREIGN PATENT DOCUMENTS

| | | |
|---|---|---|
| EP | 1193976 A2 | 4/2002 |
| WO | 0040013 A1 | 7/2000 |
| WO | 2007078738 A1 | 7/2007 |

OTHER PUBLICATIONS

European Office Action—EP 11168029.4—Dated Oct. 12, 2015.

* cited by examiner

*Primary Examiner* — John Schnurr
(74) *Attorney, Agent, or Firm* — Banner & Witcoff, Ltd.

(57) ABSTRACT

Methods, systems, computer readable media, and apparatuses for ranking search results are presented. According to one or more aspects, two or more search results may be ranked based on the extent to which each search result matches at least one search criterion and based on the amount of time that content corresponding to each search result will remain available. Content with less availability time remaining may be ranked higher than content with more availability time remaining. The ranking may also be based on a genre of the content being ranked, and availability may be weighted differently in ranking content of different genres.

16 Claims, 12 Drawing Sheets

```
                                        /1500
┌──────────────────────────────────────────────────────┐
│                   Program Guide                      │
├──────────────────────────────────────────────────────┤
│ Search Programs: Auto Sort by Genre, Availability, and Preferences │
│                                                      │
│  1501─► Current & Upcoming Programs You Might Enjoy: │
│  1502a                                      ┌─1502b  │
│      ►[11]  Pro Football: New York v. San Francisco◄ │
│                  started 11 minutes ago; 6% elapsed◄─1502c │
│                                                      │
│       [5]   Real Fake Reality Show                   │
│                  started 41 minutes ago; 68% elapsed │
│                                                      │
│      [50]   Big Action Movie                         │
│                  scheduled to start in 19 minutes; ends at 10:30 PM │
│                                                      │
│      [61]   Joe Comedian: Stand-Up Special           │
│                  scheduled to start in 49 minutes; ends at 10:00 PM │
│                                                      │
│                      ┌───────┐   ┌────────┐          │
│                      │ Close │   │ Search │          │
│                      └───────┘   └────────┘          │
└──────────────────────────────────────────────────────┘
```

1000

Preferences Menu

Customize Profiles >> Linear Programming

1001

| Content Type/Genre | Default Priority |
|---|---|
| 1. Live Football Games [live/sports/games/football] | High |
| 2. Live News [live/news] | High |
| 3. Prerecorded Sports Talk Shows [prerecorded/sports/talk] | Medium |
| 4. Prerecorded Movies [prerecorded/movies] | Medium |
|     A. Action Movies [prerecorded/movies/action] | Medium |
|     B. Comedy Movies [prerecorded/movies/comedy] | Low |
| 5. Live Sports Games [live/sports/games] | Low |
| 6. Prerecorded Sports [prerecorded/sports/games] | Low |

| Modify Settings | Cancel | Save |
|---|---|---|

Preferences Menu

Customize Profiles >> Linear Programming

1101

Live Football Games

0%     H—M—L—M—H—M—H     100%

*Tip*: The default settings above prioritize the start of each half and the end of football game.

1102

Live Reality Television Shows

0%     L—M—H     100%

*Tip*: The default settings above prioritize the end of reality television shows, as that portion often includes the climax.

FIG. 11

Program Guide — 1400

1401 → Thursday, September 23, 2010      8:11 PM

| Channel | 8:00 PM | 8:30 PM | 9:00 PM | 9:30 PM | 10:00 PM |
|---|---|---|---|---|---|
| 4 NBC | Community | 30 Rock | The Office | Outsourced | The Apprentice |
| 19 LOCAL | Local Programming | | | Paid Programming | |
| 39 BRAVO | Real Housewives of DC | | Real Housewives of DC | | Watch What Happens |

Auto Sort — 1402     Search — 1403

Program Guide — 1500

Search Programs: Auto Sort by Genre, Availability, and Preferences

1501 → *Current & Upcoming Programs You Might Enjoy:*

1502a → [11]   Pro Football: New York v. San Francisco ← 1502b
         started 11 minutes ago; 6% elapsed ← 1502c

[5]   Real Fake Reality Show
       started 41 minutes ago; 68% elapsed

[50]   Big Action Movie
       scheduled to start in 19 minutes; ends at 10:30 PM

[61]   Joe Comedian: Stand-Up Special
       scheduled to start in 49 minutes; ends at 10:00 PM Close     Search

FIG. 15

RANKING SEARCH RESULTS

CROSS-REFERENCE TO RELATED APPLICATIONS

This application claims the benefit of U.S. Provisional Patent Application Ser. No. 61/350,185, which was filed Jun. 1, 2010, and entitled "Relevance Ranking of Content Search Results," and which is incorporated by reference herein in its entirety as a non-limiting example embodiment.

BACKGROUND

Watching television historically has been a favorite pastime. As time went by and technology improved, new features like the video cassette recorder, on-screen program guide, and digital video recorder have given viewers more options and control over their viewing experience, thereby enriching that experience. As technology continues to improve, there will always be a demand for increased flexibility and functionalities in the viewing experience, particularly as an increasingly large amount of content becomes available to viewers. The present disclosure offers a variety of features to further enrich the experience of a viewer or any other consumer of content.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to ranking search results. According to one or more aspects, two or more search results may be ranked based on the extent to which each search result matches at least one search criterion and based on the amount of time that content corresponding to each search result will remain available. In some arrangements, content with less availability time remaining may be ranked higher than content with more availability time remaining.

In addition, the ranking may also be based on a genre of the content being ranked, and availability may be weighted differently in ranking content of different genres. For example, in at least one arrangement, the rank of a live sporting event included in the search results may gradually increase as time elapses towards the event's conclusion, while the rank of a movie included in the search results may gradually decrease as time elapses towards the movie's conclusion.

In some arrangements, the content may be linear video programming, and with respect to this type of content, content may remain available until a scheduled end time associated with the content. Additionally or alternatively, the content may be video on demand programming, and with respect to this type of content, that content may remain available during a window of time in which the content is accessible at the request of a user.

BRIEF DESCRIPTION OF THE DRAWINGS

The present disclosure is illustrated by way of example and not limited in the accompanying figures in which like reference numerals indicate similar elements and in which:

FIG. 10 illustrates an example of a user interface that includes a menu for prioritizing linear content according to one or more aspects described herein.

FIG. 11 illustrates an example of a user interface that includes a menu for prioritizing segments of linear content according to one or more aspects described herein.

FIG. 14 illustrates an example of a user interface that includes a program guide according to one or more aspects described herein.

FIG. 15 illustrates an example of a user interface that includes automatically ranked search results according to one or more aspects described herein.

DETAILED DESCRIPTION

Figure 1:
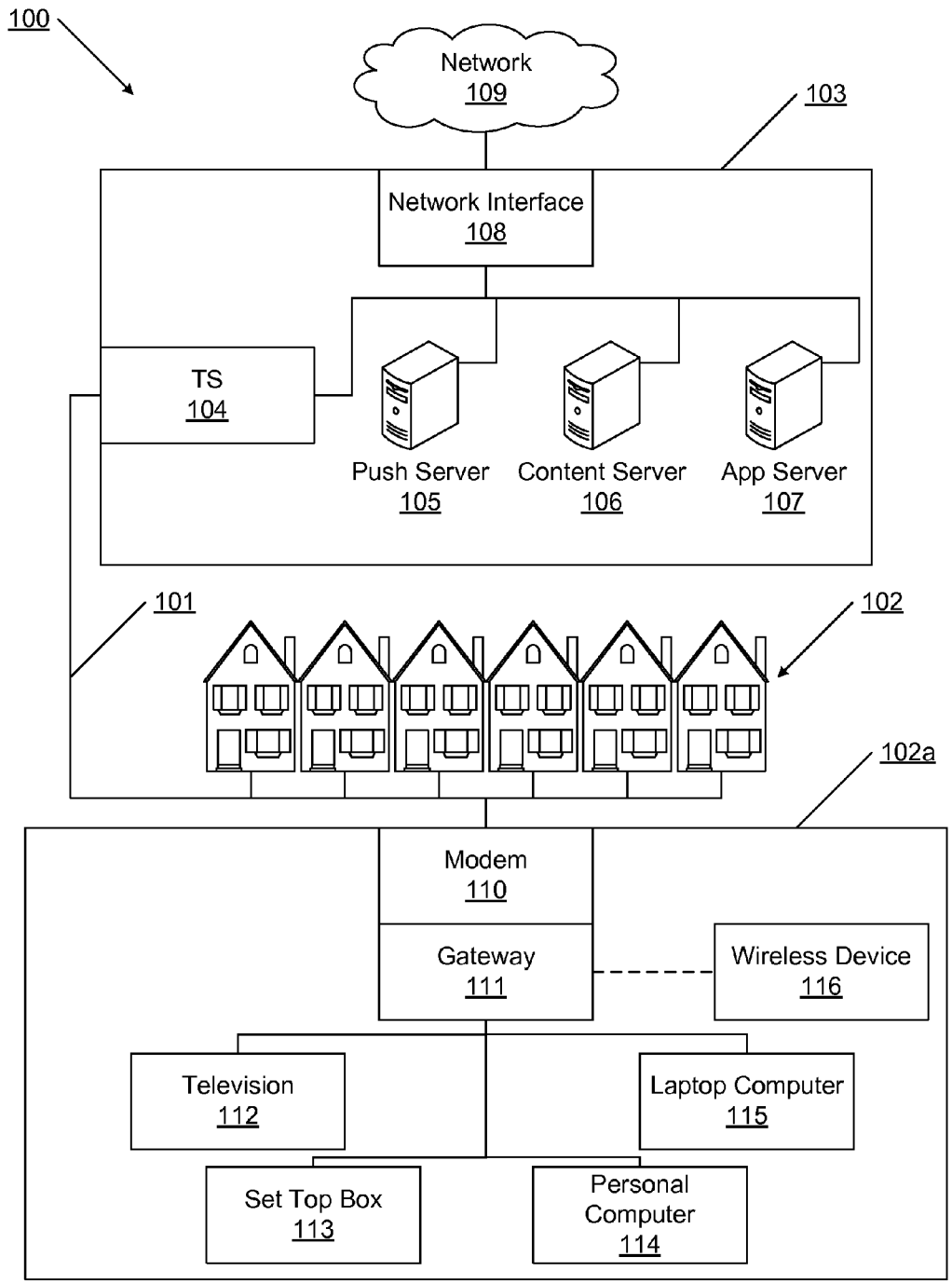
FIG. 1 illustrates an example information distribution network according to one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Aspects of this disclosure may relate to computer processing and networking technologies, broadband communications technologies, satellite communications technologies, fiber-optic communications technologies, video processing technologies, and/or multimedia computing technologies. In particular, aspects of this disclosure may relate to searching content, such as audio and video content (e.g., video on demand, movies, songs, scheduled television programs, etc.), and to ranking the search results for the user.

1. Example Use Scenarios

The following discussion describes some examples of searching and ranking that may be achieved using one or more features described herein.

In some aspects, a search for television, video, audio, movie, or other data content may be conducted using any desired program guide interface, such as a program guide provided via a device such as a service gateway, a television set-top box (STB), a digital video recorder (DVR), a personal computer, a mobile device, etc. The search may use criteria provided by a user, such as keywords, titles, actors, genre, etc., to find content that will be of most interest to the user. The results of the search can be displayed on any device or medium, such as an interface of the program guide, and can be ranked according to content type (e.g., action, sports, kids, etc.), and the ranking can, for example, take into account availability times or start times, resulting in a recency-based ranking. For example, all other things being equal, a movie about to end in 5 minutes may be deemed less relevant than a sporting event (e.g., football game) that is about to end in 5 minutes, since the last 5 minutes of a sporting event (which may contain an exciting finish, and since most users primarily care only about the outcome of the game) may be of more interest or value to a new viewer than the last 5 minutes of a movie (which may only contain the end credits, or which may spoil the ending for a viewer who has not seen the rest of the movie). Similarly, a movie that has only just begun may be deemed more relevant to a new user than a movie that is only 5 minutes from the end. In fact, a new viewer might want to avoid the last 5 minutes of a movie, for fear of spoiling the ending, and may wish to watch the other movie instead.

A search engine described herein may take into account a scheduled availability time for content matching search criteria, to determine a time-based relevance ranking. As a result, the engine may boost time-sensitive results to the top of the search results set, and reduce the weight of search results that are less interesting and/or less time-sensitive to the user. In this manner, a user may more quickly find content of most interest at the moment of the search (e.g., a sporting event may become more interesting to the user if the event is about to end).

The search engine may first store availability time information for various types of content, such as linear video content that is transmitted or broadcast according to a predefined schedule, as well as content that is available on demand to the user, such as a movie on demand. For linear content, the engine may store the channel (e.g., service provider), availability date (e.g., transmission or broadcast date), time and region for the content. For on demand content, the engine may store the date and time at which the content was initially made available to users for on demand access, and the date and time at which the content will no longer be available for on demand access (e.g., if a video on demand movie is available for a limited time, then the start and end date and time of this availability may be stored).

When the user wishes to conduct a search, the user can enter the search criteria to the engine. This can be done, for example, by choosing predefined criteria (e.g., predefined categories, genre, popularity, type, actors, title, etc.), and/or by entering new criteria (e.g., keywords). The engine can initially gather a candidate pool of search results based on the criteria alone, and can do an initial ranking of the results without consideration of availability times. This initial ranking can use, for example, popularity, type (movie, TV series, etc.), match quality (e.g., how strong of a match the content had to the keywords—full word match, partial word match, etc.), and any desired criteria.

The initial ranking can then be modified by taking into account availability times for linear and on-demand content. In doing so, the relevance of a piece of content may be modified, for example, as follows:

a. Increase the relevance rank of sporting events that are close to ending. For example, if the genre is "sports," and the scheduled end time is within a predetermined time (e.g., 10 minutes) from the current time, then the content's relevance rank may be increased by a predetermined amount. The amount increased can vary depending on whatever scale the system chooses to use.

b. Decrease the relevance rank of non-sporting events that are close to ending. For example, if the content's genre is anything other than "sports", and the scheduled end time is within the predetermined time from the current time, then the ranking can be reduced by a predetermined amount. Different types of content may be decreased at different rates. For example, comedies and murder mysteries may be treated differently, since the last 5 minutes of those types of movies can be of different value.

c. Increase the relevance rank of linear content airing or otherwise becoming available for playback within the next hour. For example, content that is being broadcast or otherwise transmitted at a scheduled time that is within a predetermined time from the current time (e.g., the next hour) may have their relevance increased by a predetermined amount. Conversely, linear content that will not be broadcast or transmitted within a predetermined time (e.g., a show that won't air or otherwise become available for playback for at least 2 days) may have its relevance ranking reduced. In other words, shows that are about to start can be ranked higher than shows that have already started, or that are starting a long time from now.

d. Increase the relevance rank of on demand content that will become unavailable soon. For example, if two on-demand movies come up in the initial search, and the first is only available until tomorrow and the other is available for two more weeks, then the first movie may have its relevance rank increased to help the user avoid missing out on it. The second movie may have its relevance rank reduced.

The examples above discuss modifying an initial search ranking. In alternative embodiments, the initial search can take into account the availability time modifications discussed above, resulting in an initial search list that is ranked with those times in account.

Search engines and related technologies may provide a convenient way of locating content that may matches one or more search terms specified by a user.

According to one or more aspects, in response to receiving a query including at least one search term, a computing device may search at least one database for one or more content items associated with the at least one search term. Subsequently, the computing device may identify, via the searching, the one or more content items in the at least one database associated with the at least one search term. Thereafter, the computing device may rank the identified one or more content items based on a first criterion and a time-based criterion, where the first criterion may be different from the time-based criterion. In at least one arrangement, the first criterion may be genre and the time-based criterion may be playback time remaining and/or availability time remaining.

Additionally or alternatively, a search engine may be provided to search for one or more content items, where the content items may be made available via a content server. The search engine may store availability time information for linear content items and video on demand content items. For the linear content items, the scheduled availability time information may include, for each content item, the channel, date, time and/or geographic region of a scheduled transmission (e.g., broadcast) of the content. For the video on demand content items, the availability time information may include, for each content item, the date and/or time at which the content item may become available and/or the date and/or time at which the content item may become unavailable.

Subsequently, in such an example system, the search engine may receive a query (e.g., from a user). In response to receiving the query, the search engine may gather, based on the query, a listing of potential search results. Having gathered the listing of potential search results, the search engine then may initially rank the potential search results without considering availability time information. For instance, the search engine may rank the potential search results based on other attributes, such as popularity, content type (e.g., movie, sitcom, live sporting event, prerecorded sporting event, etc.), genre (e.g., comedy, drama, documentary, sports, etc.), and/or match quality (e.g., whether, for any particular content item included in the search results, there was a full word match, a partial word match, etc.).

Thereafter, in such an example system, the search engine may prioritize the ranked potential search results based on availability time information (e.g., by re-ranking the potential search results based on availability time information). In this way, both the availability time information and other attributes, such as those described above, may be used to rank search results. The availability time information and the other attributes may define a content's relevance recency. These functionalities may provide a more convenient experience to a user who, for instance, may be deciding whether to watch a movie on one channel or the end of a playoff basketball game on another channel.

Thus, in one or more arrangements, the search engine and/or other features of such an example system may be configured such that a sporting event that is nearing its conclusion (e.g., a live basketball game with less that five minutes to play in the final quarter) may be given higher priority (e.g., an increased rank), while a prerecorded program that has already started (e.g., a movie that is already halfway over) may be given lower priority (e.g., a decreased rank). In at least one arrangement, the search engine may consider the score of the sporting event in prioritizing and/or ranking the search results (e.g., the live basketball game may be given higher priority if the game is tied or within eight points, but lower priority if one team is leading the other by more than eight points). In addition, as between prerecorded programs, one program that is beginning in the next hour may be prioritized over another program that is beginning in two days.

In one or more additional arrangements, with respect to video on demand content that may be available via such an example system, the search engine and/or other features of the system may be configured such that a content item that will only be available for another week may be prioritized over another content items that will be available for another two months.

By implementing one or more aspects of such an example system, a content provider may be able to provide or make accessible more relevant and/or time-sensitive search results to a user. Accordingly, a user may be able to easily and efficiently search, discover, and/or consume more relevant and/or time-sensitive content items.

Various other features and/or components may be included in and/or incorporated into such an example system. For example, in at least one arrangement, the search engine may receive a query (e.g., from a user). In response to receiving the query, the search engine may store the query for later use (e.g., in a database) and may gather, based on the query, a listing of potential search results. Thereafter, the search engine may rank and/or prioritize the search results, as further described above. In addition, the search engine may prompt a user to determine whether the user would like to configure the search engine to update the search results on a particular basis (e.g., by performing the search and/or gather search results according to a user-defined schedule, such as daily, weekly, monthly, etc.). Additionally or alternatively, the search engine simply may save the query such that the user may easily run the query again at a later time without having to reenter the query (e.g., by displaying the saved query as a user-selectable menu item and/or in a user-selectable list).

Using this methodology, a user may be able to be regularly apprised of the most recent (and/or most prioritized) content items related to their query. For instance, a user may configure the system to perform a daily search (e.g., nightly at 8 p.m.) for comedic sitcoms set in New York, reality shows that include certain celebrities, and/or cooking shows that feature vegetarian dishes. In another instance, a user may configure the system to perform a weekly search for on-demand movies featuring certain actors or set in certain places. Moreover, after the search is performed, the search engine may display the search results matching the particular query and sort the search results by recency. For example, where the user configures the system to perform a weekly search for on-demand movies featuring certain actors or set in certain places, the search engine may display the movies matching the query in the order that each movie will later be made unavailable or removed from the content server (e.g., by ascending unavailability date).

2. Hardware and Architecture

FIG. 1 illustrates an example information distribution network 100 in which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for enabling chat sessions.

An example premises 102a, such as a home, may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
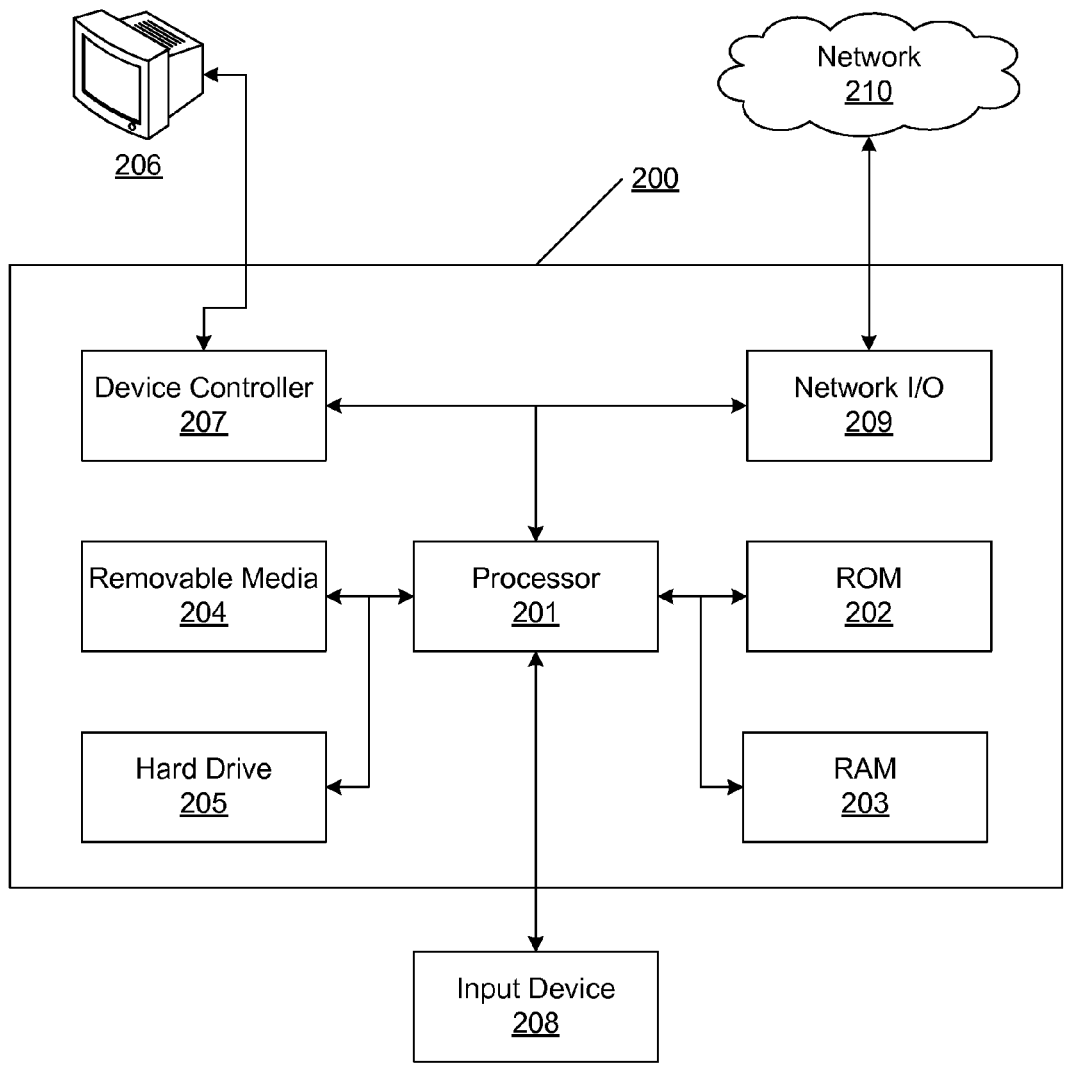
FIG. 2 illustrates an example hardware platform on which the various elements described herein may be implemented according to one or more aspects described herein.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Various features described herein may enable search results to be ranked, for example, when a user searches for content accessible from the central office 103. Particular aspects of the disclosure may relate to transmissions between a central office 103 and one or more gateways 111. These and other aspects of the disclosure will be described in detail below.

3. Search and Flow

Before the methods and user interfaces that may be used in ranking search results are described, the example programming timelines illustrated in FIGS. 3 and 4 will be described to provide some context for the various concepts related to ranking search results described below. In particular, the following discussion and the example programming timelines of FIGS. 3 and 4 may illustrate how the time at which a search for content is executed can impact the degree to which particular search results are more or less relevant than other search results.

Figure 3:
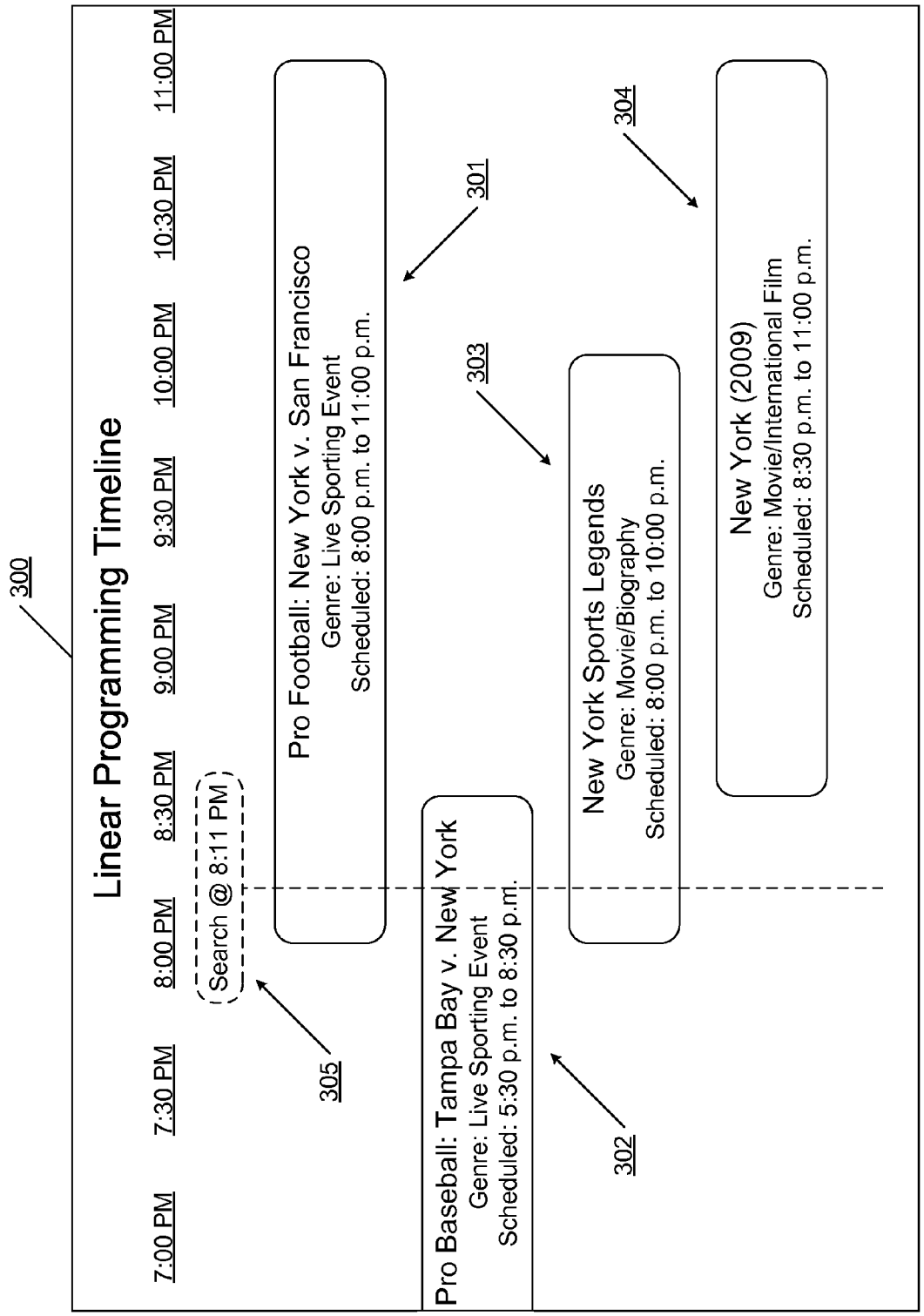
FIG. 3 illustrates an example of a linear programming availability timeline according to one or more aspects described herein.

For example, FIG. 3 illustrates an example of a linear programming availability timeline 300 according to one or more aspects described herein. The timeline 300 illustrates how the scheduled start and end times of various programs (e.g., linear programs 301, 302, 303, and 304) may relate to each other. For instance, program 301 may correspond to a live broadcast of a professional football game that is scheduled to start at 8 p.m. and end at 11:00 p.m., and program 302 may correspond to a live broadcast of a professional baseball game that is scheduled to start at 5:30 p.m. and end at 8:30 p.m.

If, at 8:11 p.m. for instance, a user of a content receiver (e.g., gateway 111) were to search for content including the words "New York" in the title, the results of such a search may include programs 301, 302, 303, and 304. In addition, as may be seen in FIG. 3, the time at which the search 305 is executed may affect how much time has elapsed and how much time is remaining in each program. According to one or more aspects of the disclosure, before these program search results are presented to the user, the search results may first be ranked based on their time availability, and this may take into account how much time has elapsed in each program, how much time is remaining in each program, and other factors (e.g., the genre of each program, whether the program is live or prerecorded, etc.).

For example, when presenting the results for the example search 305, which may represent a search at 8:11 p.m. for programming titles that include the words "New York," it may be desirable to more highly rank program 304 (which has yet to begin at 8:11 p.m.) than program 303 (which is already underway at 8:11 p.m.) because the user might not want to start watching the program in the middle of the show having missed the beginning. On the other hand, a user might be more interested in the conclusion of live sports programming than the beginning of such programming, and it accordingly may be desirable to more highly rank program 302 (which represents a baseball game that is nearing its scheduled end at 8:11 p.m.) than program 301 (which represents a football game that has only just started at 8:11 p.m.). In addition, the user further may set other preferences that affect the ranking of search results, for instance, by prioritizing certain genres of content over other genres of content (e.g., the user may specify that he or she is more interested in the start of football games than the end of baseball games, that live content should always be ranked higher than prerecorded content, that sports content should be ranked higher than movies, etc.).

The steps that may be performed by a computing device in providing these functionalities, and the user interfaces that may be used in implementing the same, are further described in greater detail below. As an overview, however, this prioritization and ranking may be accomplished by assigning each search result a baseline score that corresponds to the degree to which the search result matches the user's search criteria, and then upwardly or downwardly adjusting these scores based on time availability and/or user preferences.

Figure 4:
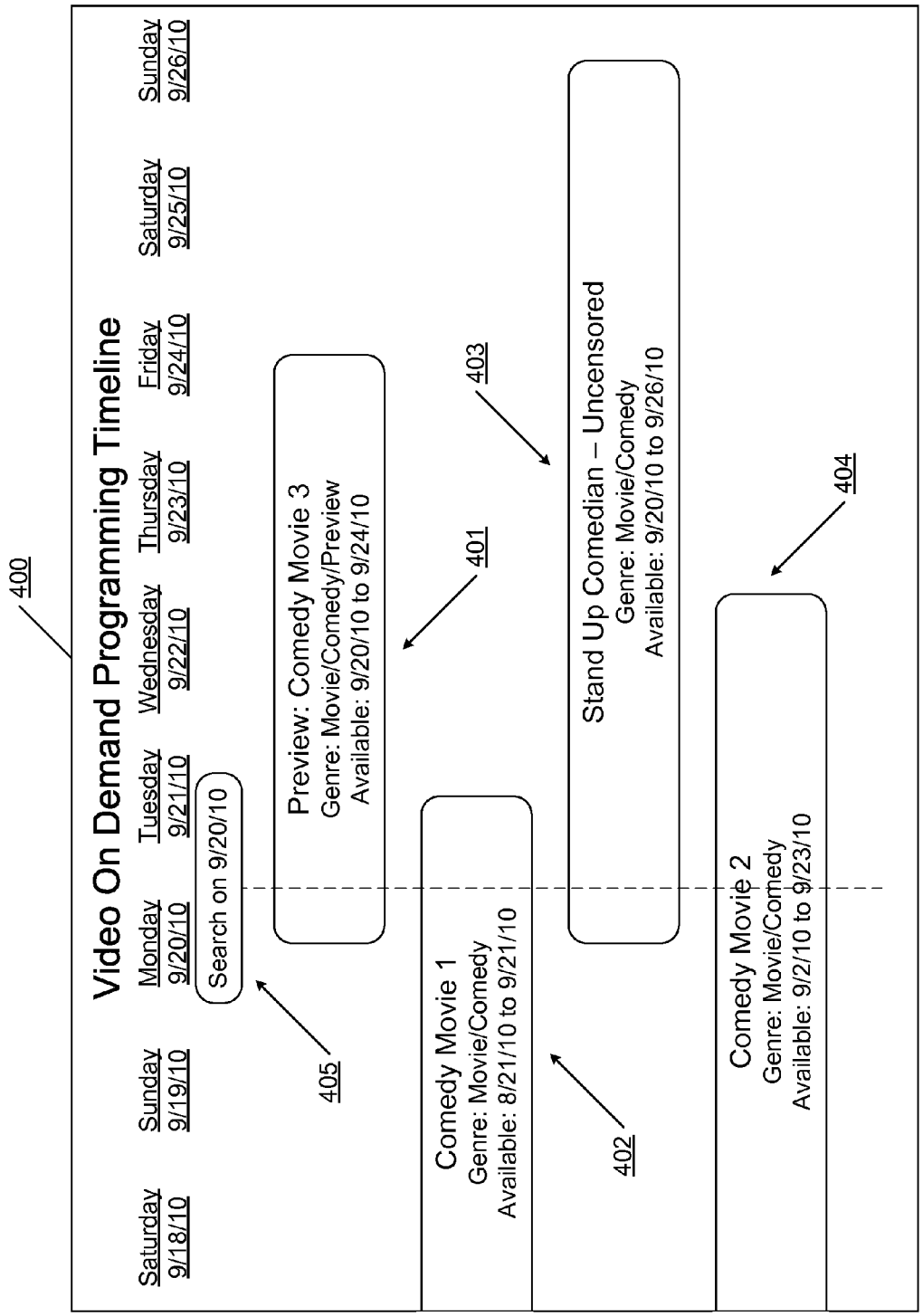
FIG. 4 illustrates an example of an on-demand programming availability timeline according to one or more aspects described herein.

FIG. 4 illustrates how similar concepts may be applied to ranking search results when dealing with on-demand content. On demand content may have its own time availability value, but the time availability may be differently defined than that of linear content. Unlike linear content, which may be transmitted to all users at a scheduled start time and available only during such transmission, on-demand content might be available to a user for playback at any desired time during a predetermined time window during which the content is offered. For instance, as seen in the example on-demand content timeline 400, some programs might be available to a user for playback during certain time periods, but not others. Typically, on-demand content is available for a predetermined numbers of days or weeks. For example, a movie may be available for on demand purchase after the movie's theatrical run is over, but before the movie is available on subscription services like HBO.

In view of the differences between on-demand and linear content, when ranking search results for on-demand content by time availability, it might be desirable to consider at least some different factors than when ranking search results for linear content. In particular, when dealing with on-demand content, the user is usually able to start playback of the content from the beginning of such content (e.g., the start of the movie, the beginning of the show, etc.). Thus, a central concern when ranking search results for on-demand content might not be how much time has elapsed in the programming (since the user may simply start playback of the content at its beginning), but rather how much longer the user has the ability to play back and view such content. For instance, when ranking search results for on-demand content, it may be desirable to more highly rank content that will be available to the user for less time (e.g., content nearing its expiration date) rather than content that will be available to the user for more time.

For example, considering the illustration presented in FIG. 4, a user might search for comedy movies, and programs 401, 402, 403, and 404 might be on-demand content items matching the user's search request. The example search 405 may be executed on September 20, and while each of the example programs 401, 402, 403, and 404 are available for playback on that date, each may have a different date after which it will become unavailable. As noted above, in ranking search results for on-demand content, it may be desirable to more highly rank content that will be available to the user for less time than content that will be available to the user for more time. Accordingly, when presenting the results of the example search 405 to the user, the user's computing device (e.g., gateway 111) may rank program 402 as having the highest priority (e.g., because among the matching search results, program 402 will become unavailable for playback first), followed by program 404 and program 401, with program 403 having the lowest priority. As with the ranking of linear search results, other factors (e.g., the genres of various on-demand content items, user preferences, etc.) besides the availability of content also may affect how the search results are ultimately ranked. For instance, the user may set preferences specifying that movie previews be ranked lower than actual movies, which in the example above, may result in program 401 being prioritized lower than the other three programs in the example search results. Again, any and/or all of this ranking may be accomplished by first assigning a baseline score to each search result (e.g., based on how strongly it matches search criteria), and then upwardly or downwardly adjusting the score based on time availability and/or user preferences.

Having set the stage for how search results may be ranked based on the availability of content, the various steps that may be performed by a computing device in providing these functionalities, and the user interfaces that may be used in implementing the same, will now be described. In one or more arrangements, any and/or all of the methods described herein may be performed by a computing device, such as computing device 200 or gateway interface device 111, and/or stored as computer-executable instructions in a computer-readable medium, such as ROM 202, RAM 203, removable media 204, and/or hard drive 205. In addition, any and/or all of the user interfaces described herein may be implemented in, displayed by, and/or caused to be displayed by a computing device, such as computing device 200 or gateway interface device 111, and/or stored as computer-executable instructions in a computer-readable medium, such as ROM 202, RAM 203, removable media 204, and/or hard drive 205.

Figure 5:
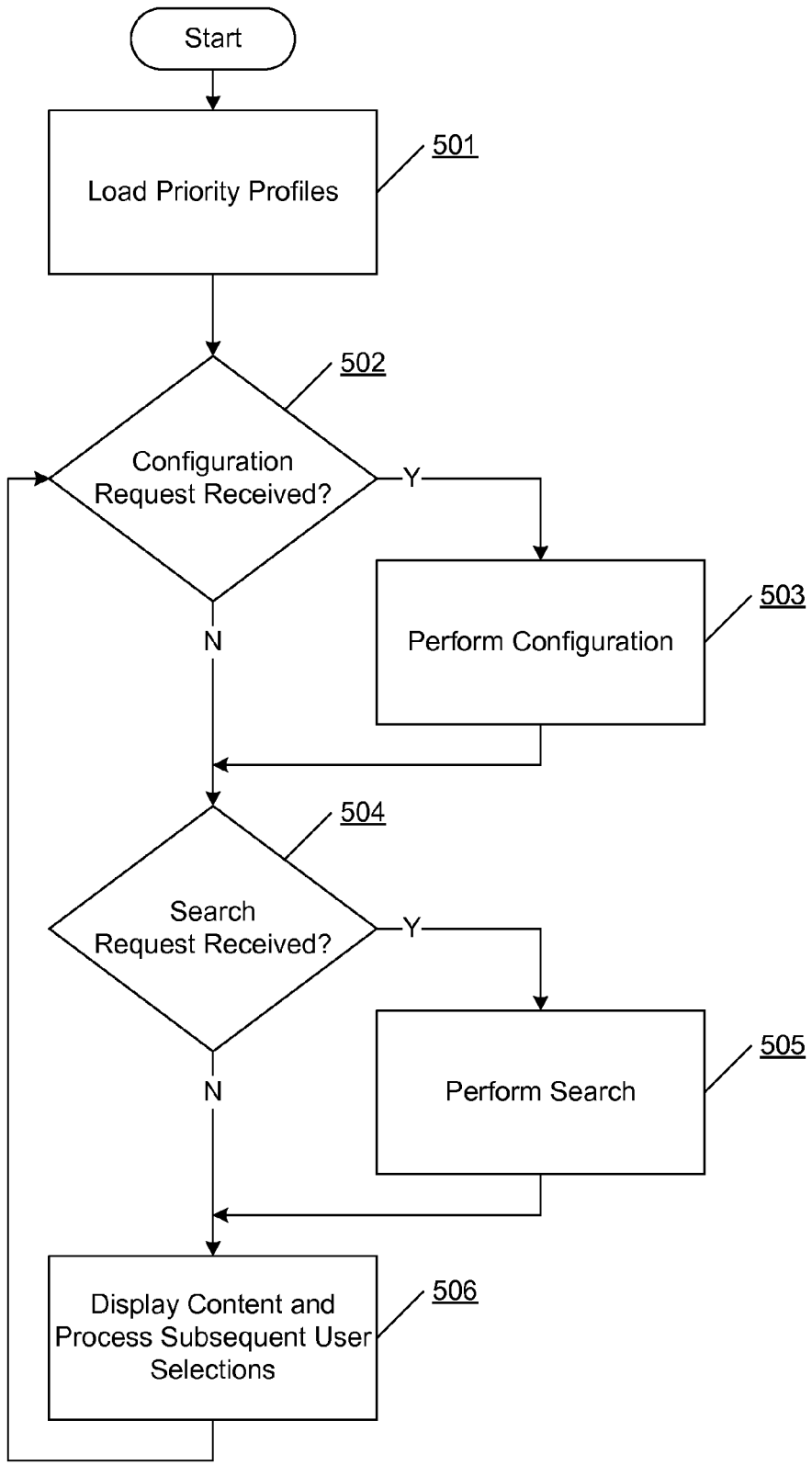
FIG. 5 illustrates an example of a method that may be implemented as a processing loop for ranking search results according to one or more aspects described herein.

Referring now to FIG. 5, a central processing loop that may be performed by a user device (e.g., gateway 111) in ranking search results according to one or more aspects described herein is illustrated. When a user's device (e.g., gateway 111) is initially powered on, for instance, and is to begin executing the example method illustrated in FIG. 5, the process may begin at step 501 of the method. In step 501, default profiles may be loaded. For example, the user's device (e.g., gateway 111) may be shipped from the manufacturer or service provider to the user with a plurality of default settings related to searching content and/or other matters, and these settings may be loaded into memory from a storage medium included in the user's device and/or downloaded from a remote server that the user's device may communicate with electronically via a network (e.g., application server 107). Additionally or alternatively, the user's preferences from a previous session may be loaded at this point, as the user may have previously modified the default settings to customize a variety of aspects of his or her user experience, such as how content is searched and how search results are ranked.

Figure 8:
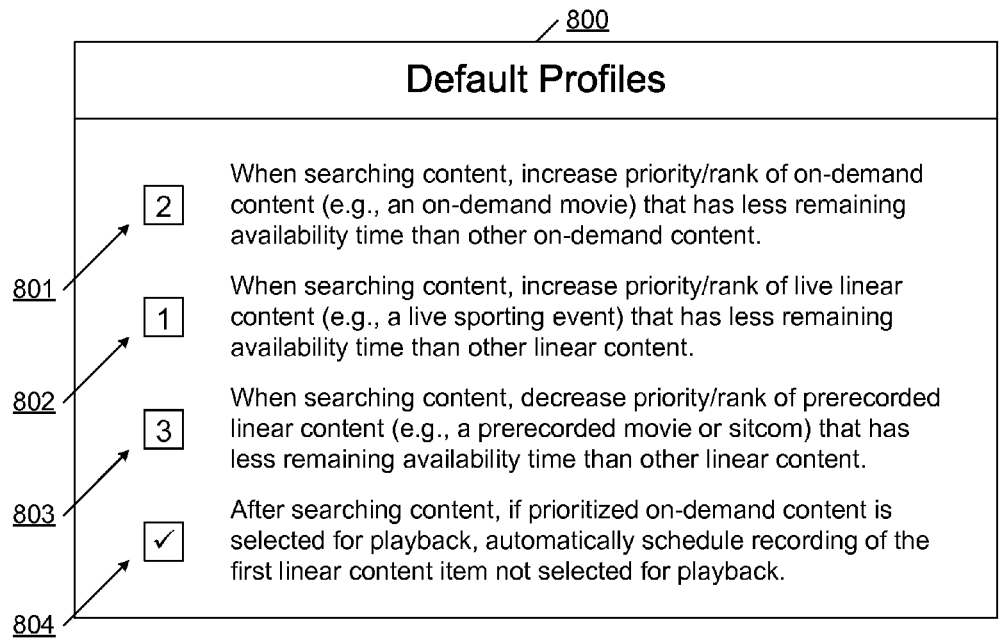
FIG. 8 illustrates an example of a user interface that includes a listing of default profiles according to one or more aspects described herein.

Some possible preferences that may be specified in a default profile or in a profile modified by a user are illustrated in the example user interface illustrated in FIG. 8. As may be seen in example user interface 800 of FIG. 8, these preferences may allow the user to prioritize particular types and/or genres of content, among other things. Additionally or alternatively, these preferences may allow the user to assign a numerical weight to the different preferences, such that where two preferences result in increasing the search result ranking or priority of different types and/or genres of content, the assigned numerical weight of the preferences may control which type and/or genre of content receives a greater increase in search result ranking or priority. For instance, per the illustrative settings in example user interface 800, content matching option 802 may be weighted (and increased in rank) more than content matching option 801, because the user may have assigned a rank of "1" of option 802 and a rank of "2" to option 801. In other configurations, options 801, 802, 803, and 804 might all be checkboxes, and a user might not assign weights to such options.

In one or more arrangements, one possible option 801 may allow the user to specify that the priority or rank of on-demand content should be increased when it has less remaining availability time than other on-demand content being searched (e.g., when an on-demand program, such as an on-demand movie, is nearing the date that it will be made unavailable or removed from the catalog of available on-demand titles). Another possible option 802 may allow a user to specify that the priority or rank of live linear content should be increased when it has less remaining availability time than other linear content being searched (e.g., when a live linear program, such as a live broadcast of a football game, is nearing its end).

Still another option 803 that may, for example, be included in a default profile may allow a user to specify that the priority or rank of prerecorded linear content (e.g., prerecorded television shows stored on and/or transmitted by a central server, as opposed to live programming, for instance) should be decreased when it has less remaining availability time than other linear content being searched (e.g., when a prerecorded linear program, such as a movie or sitcom, is already underway and perhaps nearing its conclusion). Yet another option 804 may allow a user to specify that after content is searched and ranked search results are presented, if a user selects a prioritized on-demand content item for playback, the user's device should automatically schedule a recording of the first linear content item in the prioritized list that was not selected for playback (e.g., if the user chooses to playback a prioritized on-demand movie, the user's device should schedule a recording, using an included digital video recorder for instance, of the linear content item with the highest priority, which may be a sitcom that has yet to start). These preferences may be further customized and modified to be even more specific using the user interfaces further described below. For example, preferences may be specified to prioritize certain programs based on genre (as described below with respect to FIGS. 10 and 12), particular segments of programs may be prioritized over others (as described below with respect to FIG. 11), and/or other preferences may be specified by the user.

Figure 9:
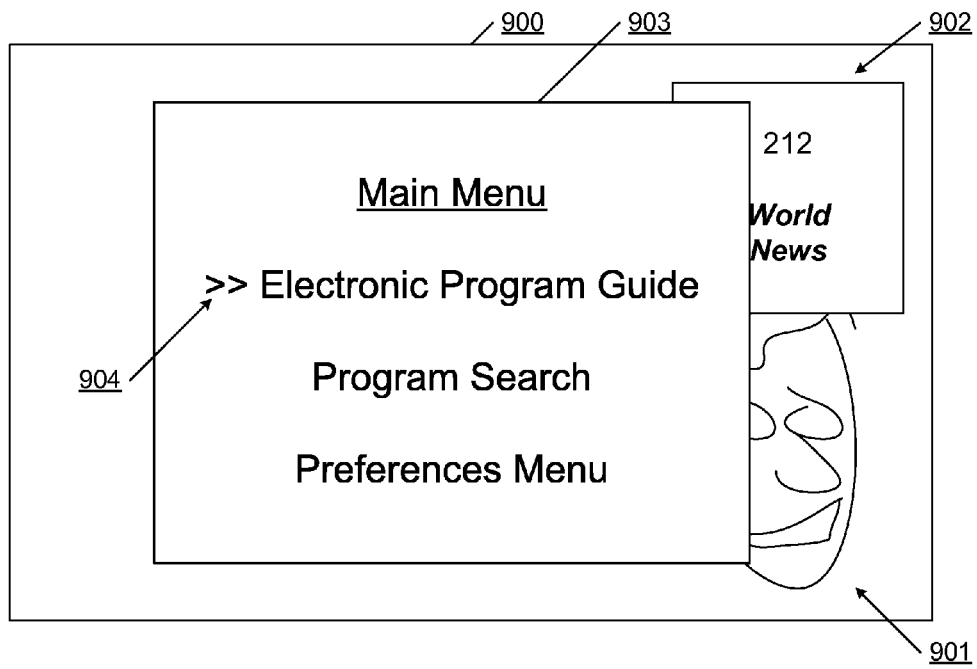
FIG. 9 illustrates an example of a user interface that includes a menu according to one or more aspects described herein.

Returning now to the example method illustrated in FIG. 5, once the default profiles or the user's modified profiles are loaded in step 501, the process may proceed to step 502 where it may be determined whether a configuration request was received. Such a configuration request may be received as input from a user via a user interface (e.g., if a user enters a request to edit settings, view a preferences menu, etc.). FIG. 9 illustrates an example user interface 900 by which such a configuration request may be received.

As seen in FIG. 9, user interface 900 may include displayed content 901, which may be linear or on-demand content being received and played back by the user's device (e.g., gateway 111). In addition, user interface 900 may include a status overlay 902, which may indicate the current channel and/or program being played, and a menu 903, which may include a plurality of selectable options. If, for example, the user were to use cursor 904 to select the "Preferences Menu" option in menu 903, this selection may constitute the configuration request addressed in step 502.

Returning again to the example method illustrated in FIG. 5, if it is determined in step 502 that a configuration request was received, then in step 503, a configuration method may be performed. According to one or more aspects, performing such a configuration method may involve performing the example method illustrated in FIG. 6, which is further described below. On the other hand, if it is determined in step 502 that no configuration request was received, then the process may proceed to step 504.

Before continuing with the description of the central processing loop illustrated in FIG. 5, the configuration method illustrated in FIG. 6 and its related example user interfaces will first be described. As may be seen in FIG. 6, several steps may be performed in configuring and customizing aspects of the user's experience relating to the searching of content and the ranking of search results.

In step 601, for example, one or more preferences menus may be displayed. The preferences menus may include user interfaces that allow a user of the device (e.g., gateway 111) to further specify how content is to be searched and how search results are to be ranked. For example, these preferences menus may allow a user to prioritize certain types of content and/or genres of content over other types and/or genres of content in the presentation of search results, as well as certain segments of programming over other segments. Some examples of such preferences menus may be seen in the example user interfaces illustrated in FIGS. 10-13.

For instance, FIG. 10 illustrates an example user interface 1000 that includes a preferences menu for modifying settings related to ranking linear content. In particular, using user interface 1000, a user may be able to assign different priority values (e.g., high, medium, low) to different types and/or genres of linear content. When a search is subsequently conducted and search results are presented, these priority values may affect the order and rank of various results (in addition to the availability of the content corresponding to each result). For example, a program of a "high" priority type or genre may be ranked higher than a program of a "medium" priority type or genre.

Thus, the example user interface 1000 may include a listing 1001 of various types of and/or genres of linear content. By rearranging the order of the listing 1001 and assigning different priority values to each type and/or genre of linear content, a user can prioritize the different types and genres of content. In addition, user interface 1000 may include various buttons (e.g., buttons 1002, 1003, and 1004) to enable the user to rearrange the listing 1001 and change priority assignments, save the settings, and close the menu without changing any settings.

As may be seen in the example listing 1001, the degree of specificity in prioritizing the different types and genres of content may be as small or as large as desired. For instance, in addition to prioritizing different types and genres of content, a user also may be able to prioritize different sub-types and sub-genres of content (e.g., by setting user preferences via one or more of the illustrated and described example user interfaces). For example, a user may generally specify that "Live News" programming should have a "High" priority, yet more specifically specify that prerecorded action movies should have a higher priority than prerecorded comedy movies (e.g., by assigning a priority of "Medium" to prerecorded action movies and by assigning a priority of "Low" to prerecorded comedy movies).

In addition to setting preferences that prioritize certain types and genres of content over others, a user might also be able to set preferences that prioritize certain segments of programming over other segments. For instance, FIG. 11 illustrates an example user interface 1100 that includes a preferences menu for modifying settings related to ranking certain segments of linear programming over others.

In one or more arrangements, user interface 1100 may include one or more slider bars, such as slider bars 1101 and 1102, which each may allow a user to set and modify the relative priority of different portions of content of a particular type and/or genre. For example, by adding, removing, and/or modifying the position of the various arrows on slider bar 1101, the user may prioritize different segments of a linear content item corresponding to a live broadcast of a football game. In particular, the slider bar (e.g., slider bar 1101) itself may represent a timeline corresponding to the entire length of a program of the particular genre and/or type, and the spaces in between the arrows may represent the variously prioritized segments.

For example, considering the example settings defined by the arrows of slider bar 1101, various segments of a football game may be assigned different priority levels, such that if a search for programming is executed while the football game is being broadcast, the rank of the football game in the search results may vary depending on the current segment of the football game and its respective assigned priority level. In particular, if a user were to arrange the arrows of slider bar 1101 in the manner illustrated in FIG. 11, for instance, and subsequently conduct a search for content in which a broadcast of a live football game was a search result, the live football game might appear towards the top of a ranked list of search results near the beginning of the game, shortly after halftime, and/or towards the end of the game. On the other hand, if in this example the search were conducted in the middle of the second quarter of the football game, the broadcast might not appear as close to the top of the search results because during that portion of the program, the assigned priority level for the football game is lower.

The example settings defined by the arrows of slider bar 1102 provide another example of how slider bars may be used to assign different priority levels to various portions of a program. For instance, by arranging the arrows of slider bar 1102 in the manner illustrated in FIG. 11, a user may be able to specify that the priority level of a live reality television program should gradually increase as the program nears its end. In some arrangements, this gradual increase in priority of a live reality television program may be defined by a default profile included in the user's device (e.g., gateway 111), and user interface 1100 may provide the user with a way to adjust these default settings. The user's device also may include default settings for other types of programs as well, and these settings also may correspond to default profiles.

Figure 12:
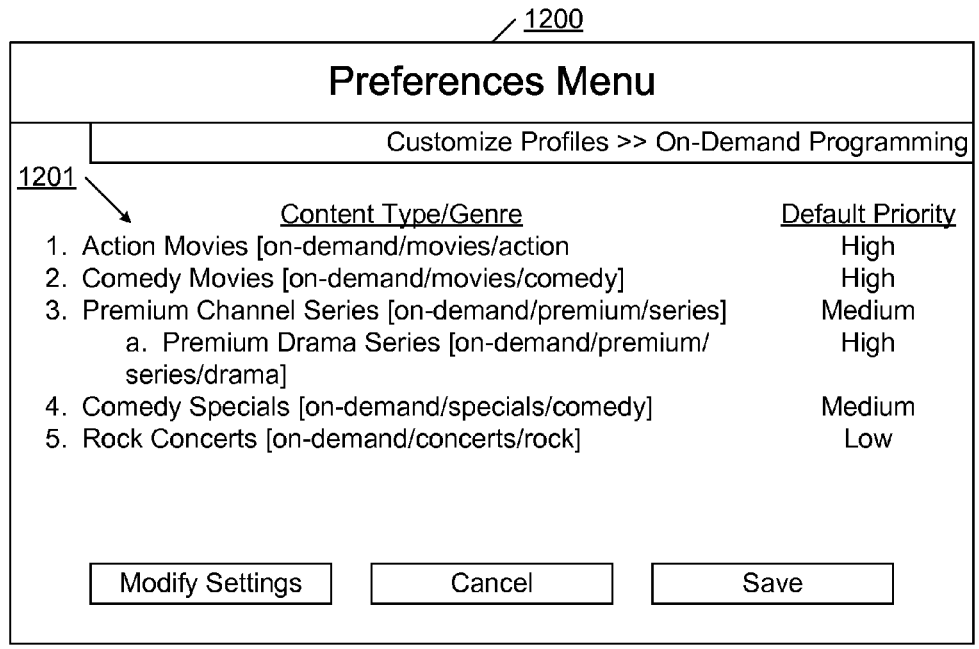
FIG. 12 illustrates an example of a user interface that includes a menu for prioritizing on-demand content according to one or more aspects described herein.
Figure 13:
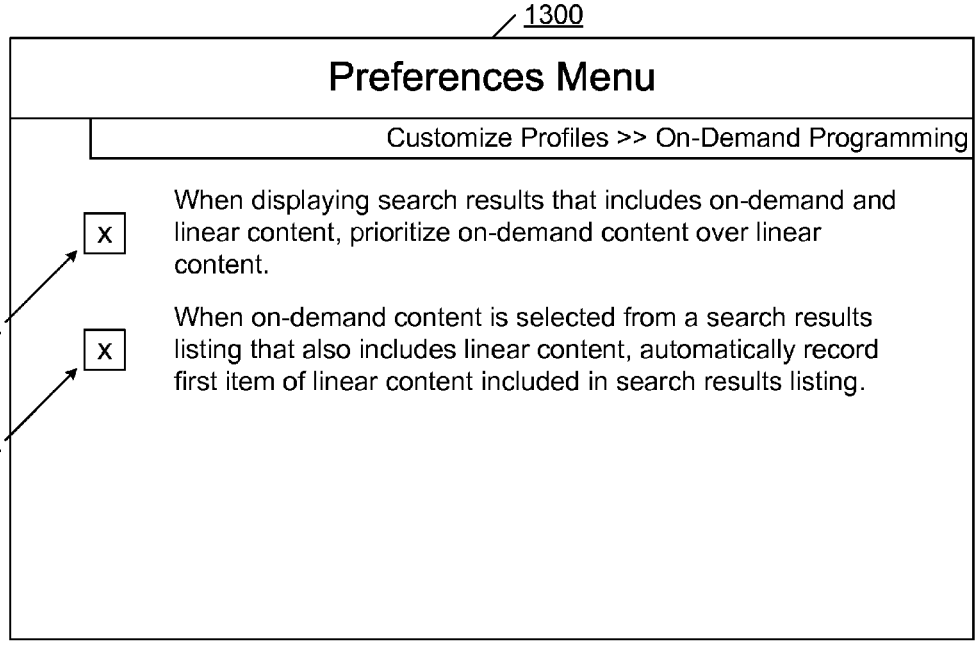
FIG. 13 illustrates an example of a user interface that includes additional options for prioritizing linear and on-demand content according to one or more aspects described herein.

In addition to displaying preferences menus that relate to the ranking of linear content in 601, preferences menus that deal with the prioritization of on-demand content also may be displayed. FIGS. 12 and 13 illustrate examples of user interfaces that include such preferences menus.

For instance, FIG. 12 illustrates an example user interface 1200 that includes a preferences menu for modifying settings relating to ranking on-demand content. Via user interface 1200, a user may be able to assign different priority values (e.g., high, medium, low) to different types and/or genres of on-demand content. As noted above, these priority values, along with content availability, subsequently may affect the order and rank of search results when content is later searched for.

Similar to the example user interface illustrated in FIG. 10, user interface 1200 of FIG. 12 may include a listing 1201 of various types and/or genres of on-demand content. The listing 1201 may be rearranged by a user to prioritize different types and genres of content, and different priority values/levels may be assigned to the different types and genres of content included in the listing 1201. In addition, as was the case with user interface 1100, the degree of specificity in defining types and/or genres included in the listing 1201 may be varied, such that content may be characterized as broadly or as narrowly as desired. For example, a user may specify that "Premium Channel Series" programming should generally have a "Medium" priority, but more specifically specify that "Premium Drama Series" programming (which may be a subset of "Premium Channel Series" programming) should have a "High" priority.

Another example user interface that includes a preferences menu addressing on-demand content is illustrated in FIG. 13. In particular, via user interface 1300 of FIG. 13, a user may be able to set and modify options related to how search results should be handled when such results include both linear and on-demand content items.

For example, user interface 1300 may include one or more configuration options, such as options 1301 and 1302. In one or more arrangements, option 1301 may, for instance, allow a user to specify that when search results are displayed that include both on-demand and linear content, the on-demand content should generally be prioritized over the linear content. Another option 1302 may, for example, allow a user to specify that when on-demand content is selected for viewing from a search results listing that also includes linear content, the user's device (e.g., gateway 111) should automatically record the first linear content item included in the search results listing (or cause such content to be recorded, e.g., with a digital video recorder).

Figure 6:
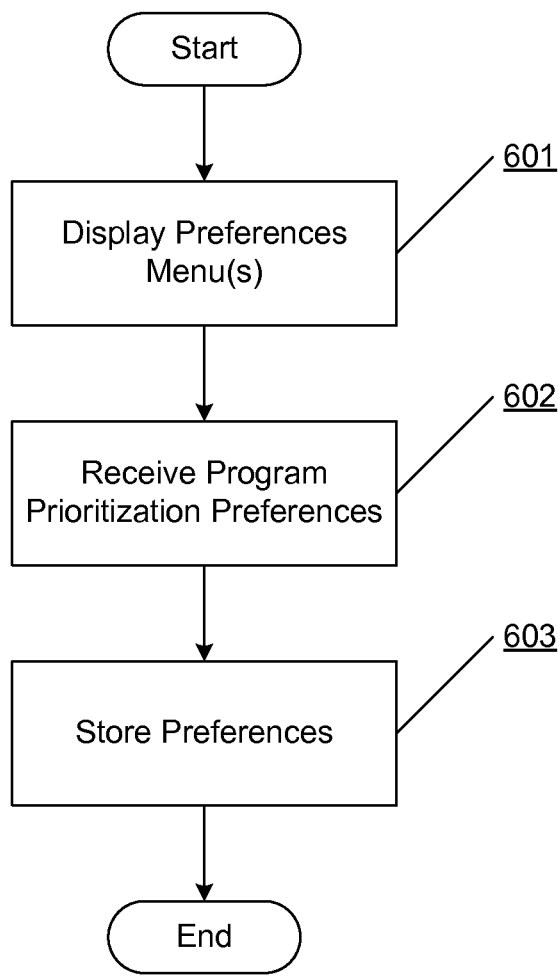
FIG. 6 illustrates an example of a method that may be implemented as a configuration method in the processing loop for ranking search results according to one or more aspects described herein.

Returning now to the configuration method illustrated in FIG. 6, after preferences menus are displayed in step 601, program prioritization preferences (e.g., one or more of the preferences described above with respect to step 601 and/or set via the above-described user interfaces to prioritize certain types and/or genres of content) may be received in step 602. Such program prioritization preferences may be received, for example, via the one or more user interfaces displayed in step 601.

Subsequently, in step 603, the program prioritization preferences may be stored. For example, having received the various user preferences via the user interfaces described above, the user's device (e.g., gateway 111) may store the preferences in local memory (e.g., memory included in gateway 111) and/or remotely on a server (e.g., application server 107). Thereafter, the configuration method illustrated in FIG. 6 may end, and the process may return to the central processing loop illustrated in FIG. 5.

Thus, referring again to the central processing loop illustrated in FIG. 5, whether or not the configuration method was performed, it may be determined in step 504 whether a search request was received. Such a request may be received, for instance, via a displayed user interface and/or via a physical button on the user's device or an associated remote control. For example, a user may select a "Search" button of a user interface or press a "Search" button on a remote control associated with gateway 111.

If it is determined in step 504 that a search request was received, then in step 505, a search method may be performed. According to one or more aspects, performing such a search method may involve performing the example method illustrated in FIG. 7, which is further described below. On the other hand, if it is determined in step 504 that no search request was received, then the process may proceed to step 506.

Before continuing with the description of the central processing loop illustrated in FIG. 5, the search method illustrated in FIG. 7 will first be described. As may be seen in FIG. 7, several steps may be performed in searching for content and ranking search results.

For example, in step 701, a search user interface may be displayed. Such a user interface may, for instance, resemble user interface 1600 of FIG. 16, which is further described below.

Subsequently, in step 702, a search criterion may be received. The search criterion may, for instance, be a word or phrase (e.g., "New York") or it simply may be a type or genre of content (e.g., "Action movies").

In step 703, content items matching the search criterion may be searched for and identified. For example, if the user's device (e.g., gateway 111) were to receive the phrase "New York" as the search criterion in step 702, then in step 703, gateway 111 may search a database of programming information for content items that include the phrase "New York" in their title, in their description, and/or in other fields, and programs that include the search phrase may be identified as search results. The database of programming information may, for instance, be stored locally by the user's device (e.g., gateway 111) and updated periodically based on information received from a server (e.g., a server at central office 103), and/or the programming information may be stored remotely at the server (e.g., application server 107) and accessed by the user's device. Additionally or alternatively, each search result may be assigned a baseline score representing how strongly it matches the search criteria, and this may enable ranking of the search results, as further described below.

In step 704, the user's device (e.g., gateway 111) may load the program information for each search result. Such program information may include, for instance, the title of the program, the scheduled start and stop times of the program, the genre and/or type of the program, and/or the like. The user's device (e.g., gateway 111) may load this information from the database consulted in step 703. In particular, the database of programming information may include information corresponding to the title, description, scheduled start and end times, and/or genre and/or type for each program available for viewing, and the user's device may load program information corresponding to each search result based on information stored in this database.

In step 705, the availability time for each search result may be calculated. In one or more arrangements, how the availability time of a particular search result is calculated may depend on whether the particular search result corresponds to a linear content item or an on-demand content item, as further described below.

According to one or more aspects, where a linear program has already started, the availability of a linear content item may be determined by calculating the difference between the current time and the scheduled end and/or start time of the program, and the amount of availability may be expressed as the amount of time remaining in the program (e.g., in seconds, minutes, hours, etc.) or fraction of program remaining (e.g., a half, a third, etc.). For example, considering example program 301 of FIG. 3 for a moment, in a hypothetical situation where program 301 is scheduled to start at 8:00 p.m. and end at 11:00 p.m., and where a search is performed at 8:11 p.m., the availability of the program may be determined to be "169 minutes remaining" and/or "6% elapsed."

On the other hand, where a linear program has yet to start, the availability of the linear content item may be determined by calculating the difference between the current time and the scheduled start time of the program, and once again the amount of availability may be expressed as an amount of time (e.g., in seconds, minutes, hours, days, etc.). Additionally or alternatively, where availability is calculated for a linear program that has yet to start, the availability may be stored as a negative number (e.g., as a number less than zero that essentially corresponds to a countdown to the scheduled start time of the program) to indicate that the scheduled start time of the program has yet to arrive. By storing the availability as a negative number in these situations, a computing device implementing one or more aspects of the disclosure may further differentiate between linear programs that have already started and those that have yet to start. For example, considering example program 304 of FIG. 3 for a moment, in a hypothetical situation where program 304 is scheduled to start at 8:30 p.m. and end at 11:00 p.m., the availability of the program may be determined to be "−19 minutes" and/or "not started" and/or "starting in 19 minutes." In some arrangements, such a number (e.g., a value representing program availability) may simply be treated as negative in a formula and/or other availability calculation instead of being stored independently as a negative number.

As noted above, the manner in which the availability of each on-demand content item is calculated may be different from how the availability of each linear content item is calculated. According to one or more aspects, the availability of an on-demand content item may be determined by calculating the difference between the current time and the scheduled expiration date of the content (e.g., the last date on which the content will be available for on-demand purchase), and as with the availability of linear content, this difference may be expressed in seconds, minutes, hours, days, etc. For example, considering example program 401 of FIG. 4 for a moment, in a hypothetical situation where program 401 is scheduled to expire on Sep. 24, 2010, and where a search is performed on Sep. 20, 2010, the availability of the program may be determined to be "4 days remaining." In addition, where an on-demand program is not yet available for playback by a user, the availability of such a program may be expressed as a negative number, similar to how the availability of a linear program that has not yet started may be expressed as a negative number.

Figure 7:
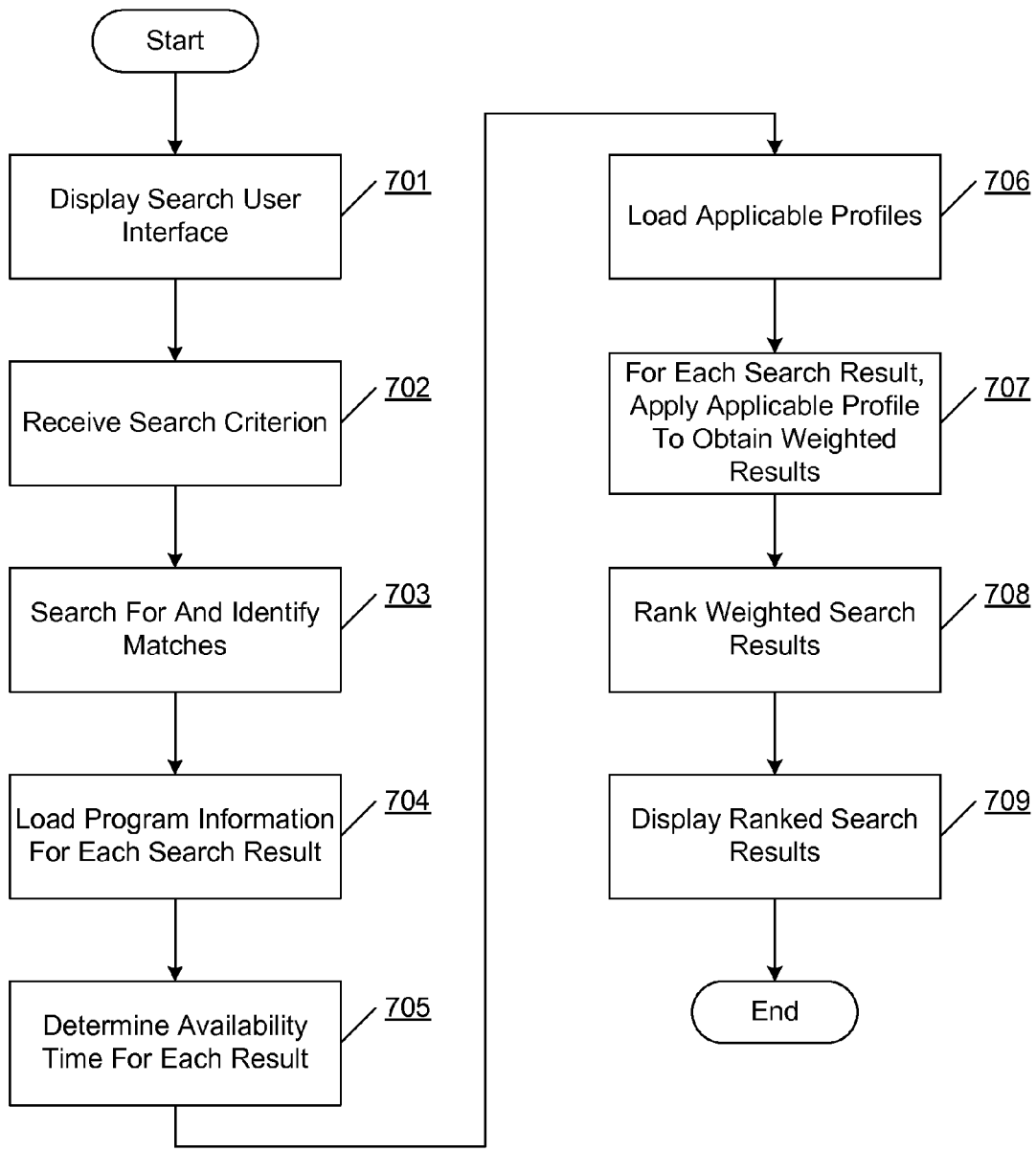
FIG. 7 illustrates an example of a method that may be implemented as a search method in the processing loop for ranking search results according to one or more aspects described herein.

Referring again to the search method illustrated in FIG. 7, once the time availability values of the various search results are calculated in step 705, the applicable profiles may be loaded in step 706. For example, in step 706, the user's device (e.g., gateway 111) may load the profiles and user preferences defined by default settings and/or by the configuration options set during the configuration method described above. These profiles may be stored in and loaded from local memory included in the user's device (e.g., gateway 111) and/or may be stored in and loaded from a remote server (e.g., application server 107) that communicates with the user's device. If, for instance, the search results include both linear content items and on-demand content items, then profiles dealing with both linear content and on-demand content may be determined to be applicable and accordingly may be loaded in performing this step.

In step 707, one or more of the previously loaded profiles may be applied to each search result to obtain one or more weighted search results. For example, as discussed above, a user may have set preferences specifying that certain genres and/or types of programs should be prioritized over other genres and/or types of programs, and these preferences may be stored in profiles that may be applied to the search results in this step to obtain weighted search results. Additionally or alternatively, and as also discussed above, a user may have set preferences specifying that certain segments of programming should be prioritized over other segments, and these preferences also may be stored in profiles that might be applied to the search results in this step to obtain weighted search results.

In one or more arrangements, applying the profiles and obtaining weighted search results may include performing a weighting algorithm. Performing such a weighting algorithm in turn may include assigning a baseline numerical score to each search result based on the extent to which (e.g., how strongly) the particular search result's corresponding content item matches the user's search criterion (e.g., based on the percentage of phrases and/or characters in the search criterion that are also found in the corresponding fields of the content item, such as the content item's title, description, etc.), adjusting (e.g., increasing or decreasing) that numerical score based on the availability time (as determined in step 705), and then further adjusting that numerical score based on any applicable preferences stored in the user profiles (by again increasing or decreasing the numerical score as dictated by the user profiles). The steps of this weighting algorithm may be repeated for each of the search results identified in step 703 to obtain the one or more weighted search results.

For example, a search result that is determined to be a 99% match to the search criterion may be assigned a baseline numerical score of 99. Similarly, another search result that is determined to be a 74% match to the search criterion may be assigned a baseline numerical score of 74, for example. In subsequently adjusting the numerical score of a search result based on the availability time of its corresponding content, the numerical score of the search result may be increased or decreased by predetermined amounts according to a time-based and content-based hierarchical scheme, where increasingly desirable content may, for instance, have its score increased by a greater amount and where less desirable content may have its score increased by a lesser amount (or such content may have its score decreased). In addition, in such a scheme, it may be desirable to treat different types and/or genres of content differently, because, as further described above, some content may become less desirable to a user as the content nears its conclusion (e.g., a prerecorded linear program, such as a movie or sitcom, that is already underway), while other content may become more desirable to a user as the content nears its conclusion (e.g., a live broadcast of a football game that is nearing its end). Thus, different types and/or genres of contents may be subject to different levels of score increases and decreases under such a hierarchical scheme.

For instance, search results corresponding to live linear programs (e.g., live broadcasts of sporting events that are underway) that have less than 10 minutes remaining may have their numerical score increased by 10, while search results corresponding to live linear programs that have less than 30 minutes remaining, but more than 10 minutes remaining, may have their numerical score increased by 5. As another example, search results corresponding to prerecorded linear programs (e.g., movies and sitcoms that are underway) that are scheduled to start in less that 10 minutes (and have not yet started) may have their numerical score increased by 10, while search results corresponding to prerecorded linear programs that are already underway and/or have less than a predetermined amount of time left (e.g., 30 minutes, 10 minutes, etc.) may have their numerical score decreased by 10. As still another example, search results corresponding to on-demand programs that are scheduled to become unavailable in less than three days may have their numerical score increased by 10, while on-demand programs that are scheduled to remain available for at least fourteen additional days may have their numerical score decreased by 10. The values and hierarchical arrangement in these examples is only illustrative, and any desired amounts and hierarchical levels may be used (e.g., to emphasize and/or deemphasize any desired types and/or genres of programs).

For example, each different type of content may have different availability factors that affect the ranking of search results corresponding to the particular type of content. For instance, a possible availability factor that may affect the ranking of search results corresponding to live linear content (e.g., a broadcast of a live sporting event) may be the amount of time remaining in such content (e.g., the amount of time left in the sporting event). Similarly, the amount of time remaining in content may also be an availability factor that affects the ranking of search results corresponding to prerecorded linear content (e.g., a prerecorded linear program, such as a movie or sitcom), although this factor may have a different effect on the ranking of prerecorded linear content than it does on the ranking of live linear content (e.g., as there is less time remaining in a particular prerecorded linear program, the ranking of such a program may decrease, whereas when there is less time remaining in a live linear program, the ranking of such a program may increase). Another possible availability factor that may affect the ranking of search results corresponding to prerecorded linear content (e.g., a prerecorded linear program, such as a movie or sitcom) may be the amount of time until the content is scheduled to start (e.g., how much time remains until the program is scheduled to be transmitted or broadcast). Additionally, a possible availability factor that may affect the ranking of search results corresponding to on-demand content may be amount of time for which the on-demand content will remain available for playback.

Subsequently, in further adjusting the numerical scores of search results based on any applicable preferences stored in the user profiles, for instance, the numerical scores may be increased or decreased by predetermined amounts according to the various priority levels and/or ranks assigned by the user to different types and/or genres of content. For example, search results that correspond to content items falling into types and/or genres to which the user has assigned a "High" priority may have their numerical score increased by 5. Similarly, in this example, search results that correspond to content items falling into types and/or genres to which the user has assigned a "Low" priority may have their numerical score decreased by 5, and search results that correspond to content items falling into types and/or genres to which the user has assigned a "Medium" priority might not have their numerical score changed again at this point. Here again, the values and hierarchical arrangement in these examples is only illustrative, and any desired amounts and hierarchical levels may be used.

In this manner, one or more user profiles may be applied and weighted search results may be obtained, and the weighted search results may result in adjustments to the rankings which may otherwise be based on availability time. For example, in a hypothetical situation where the user searches for "New York" at 8:11 p.m., as in the illustrative situation represented by the example programming timeline 300 of FIG. 3, programs 301, 302, 303, and 304 might match the search criteria and accordingly be considering search results. When sorting these search results only based on time availability (e.g., before applying user program prioritization preferences), the user's device (e.g., gateway 111) might rank the live baseball game corresponding to program 302 over the live football game corresponding to program 301 because between the two live linear content items, program 302 may be closer to its scheduled end time and accordingly may be a higher priority according to the default profiles described above. If, however, the user also set preferences similar to those illustrated in FIG. 10, for example, where "Live Football Games" are prioritized over other "Live Sports Games," then in applying the profiles to obtain weighted search results in step 707, the live football game corresponding to program 301 might be ranked higher than the live baseball game corresponding to program 302 because the user preferences defined by the profiles specify that the broadcast of the live football game should be given higher priority than other live sports programming (even though the program 302 corresponding to the live baseball game may be closer to its scheduled end time).

Referring again to the search method illustrated in FIG. 7, in step 708, the weighted search results may be ranked. In one or more arrangements, ranking the search results in step 708 may generally involve placing the search results in an order dictated by the various default profiles and user preferences described above. For example, the user's device (e.g., gateway 111) may rank the search results based on their weighted scores (e.g., the scores determined in step 707) and/or in accordance with default profiles and/or other user settings. Considering the example in the preceding paragraph involving the live football game and the live baseball game, for instance, the user's device may rank the live football game higher than the live baseball game based on determining that the live football game has a higher priority than the live baseball game in view of the availability of each program and the previously applied profiles causing the football game to have a higher weighted score than the live baseball game. The other search results may be similarly ranked, for instance, and the ordered list may be stored in memory by the user's device (e.g., gateway 111) for further processing and/or display.

Figure 17:
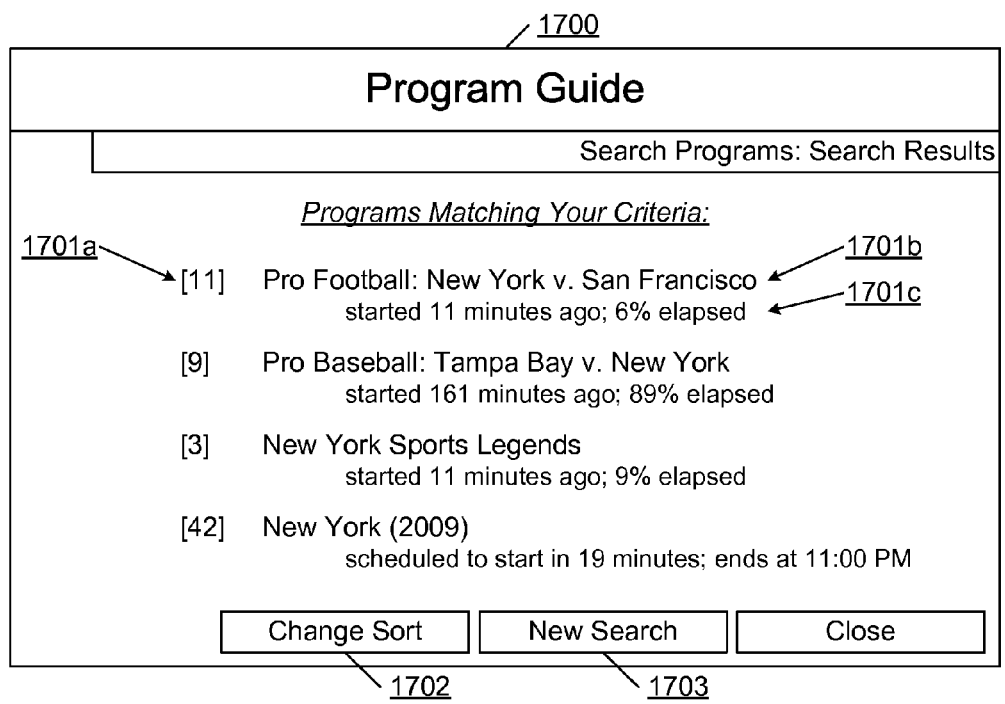
FIG. 17 illustrates an example of a user interface that includes ranked search results according to one or more aspects described herein.

Subsequently, in step 709, the ranked search results may be displayed. In one or more arrangements, the user's device (e.g., gateway 111) may display or cause to be displayed the ranked search results via a user interface, such as user interface 1700 of FIG. 17, for instance, which is further described below. Thereafter, the search method illustrated in FIG. 7 may end, and the process may return to the central processing loop illustrated in FIG. 5.

Thus, referring again to the central processing loop illustrated in FIG. 5, whether or not the search method was performed, content may be displayed and subsequent user selections may be processed. For example, the user's device (e.g., gateway 111) may display linear and/or on-demand content received from a remote server (e.g., a server at central office 103), in addition to continuing to process user selections, such as requests to modify user preferences and configuration settings, requests to search for content, and/or other requests that the user's device might receive (e.g., requests to change channels, adjust volume, etc.). Subsequently, the process may return to step 502 of the processing loop (described loop) in which it may be determined whether a configuration request was received. The central processing loop of FIG. 5 may continue to be executed, for instance, until the user's device (e.g., gateway 111) is powered off or placed into a standby mode.

Having described the central processing loop and various methods and user interfaces that may be performed and/or used in implementing the functionalities described herein, some additional functionalities and user interfaces that illustrate examples of how a user might experience these functionalities will now be described.

For instance, a user's interaction with the functionalities described above might begin when the user is viewing an electronic program guide and deciding what to watch. An example of such an electronic program guide may be seen in the example user interface 1400 illustrated in FIG. 14. In some instances, rather than entering a search criterion (as in one or more of the examples described above), a user may wish to simply sort all currently playing, upcoming, and otherwise available programs based on availability, default profiles, and the user's preferences.

For example, user interface 1400 may include program listings 1401 and one or more command buttons (e.g., buttons 1402 and 1403). In at least one arrangement, button 1402 may perform an "auto sort" function, which may involve displaying a listing of one or more currently playing or upcoming programs that is ranked according to availability, default profiles, and/or user preferences, as described above. In addition, selecting button 1402 may cause the example user interface illustrated in FIG. 15 to be displayed.

If the user selects the "auto sort" button 1402, the user's device (e.g., gateway 111) may essentially perform the search method described above, except that the search criterion might be an empty set. Thus, in identifying matches, the user's device might identify all currently playing, upcoming, and otherwise available programs as matches, and subsequently may sort and rank these programs based on availability, the default profiles, and the user's preferences.

Therefore, in one or more arrangements, user interface 1500 of FIG. 15 may include a listing 1501 of one or more recommended programs. As noted, the listing 1501 may be populated automatically, for instance, with search results identified and ranked by performing the search method described above. In addition, additional information about each recommended program included the listing 1501 may be displayed via user interface 1500. For example, each recommended program in the listing 1501 may be displayed with a corresponding channel number 1502a, a program title 1502b, and program status information 1502c. In one or more arrangements, the program status information 1502c may include availability information, such as how much of the program has elapsed (if any), how long until the program starts (if it has yet to begin), when the program is scheduled to end or otherwise become unavailable, and/or the like.

Figure 16:
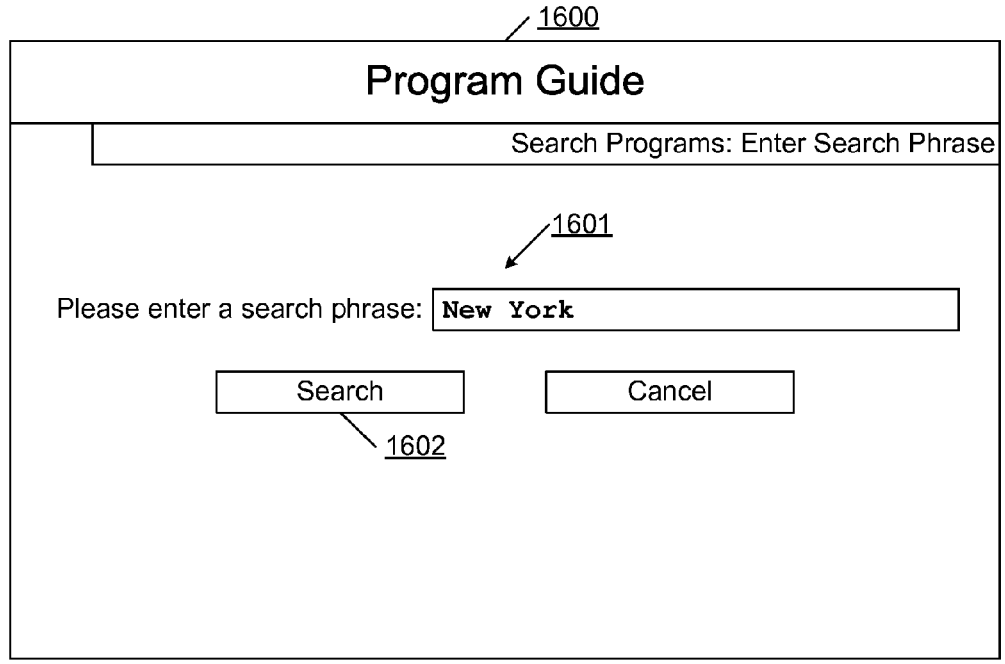
FIG. 16 illustrates an example of a user interface that includes a search box according to one or more aspects described herein.

Referring again to FIG. 14, if a user were to select the "search" button 1403 of user interface 1400 instead of the "auto sort" button of 1402, then in at least one arrangement, a "search" function may be performed, which may involve receiving a search criterion from the user (and/or otherwise performing the search method described above) and/or displaying the example user interface illustrated in FIG. 16.

FIG. 16 illustrates an example user interface 1600 that includes a search box 1601 by which a search criterion may be received from a user according to one or more aspects described herein. For instance, a user may enter a search phrase (e.g., "New York") into search box 1601 and subsequently may select the search button 1602 to command the user's device (e.g., gateway 111) to search for content associated with the search phrase.

For example, considering the example programming timeline 300 of FIG. 3 for a moment, if a user were to search for the phrase "New York" at 8:11 p.m., programs 301, 302, 303, and 304 might match as search results and subsequently be ranked based on their availability and in accordance with any default profiles and user preferences, per the above-described search method. In displaying the search results, the user's device may display (or cause to be displayed) the example user interface 1700 illustrated in FIG. 17.

In one or more arrangements, user interface 1700 may include a ranked listing of search results, and each search result may correspond to a program. Additional information also may be displayed about each search result included in the listing. For example, each search result in the listing may be displayed with a corresponding channel number 1701a, a program title 1701b, and program status information 1701c. Additionally or alternatively, user interface 1700 may include a change sort button 1702, which may allow a user to modify user preferences (e.g., by initiating the configuration method), as well as a new search button 1703, which may allow the user to perform a new search (e.g., by displaying the example user interface illustrated in FIG. 16 again and/or by performing the search method described above).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method, comprising:
   storing, by a computing system, listing information;
   receiving a search request;
   responsive to the search request, using the listing information to generate search results indicating first content and second content;
   determining a first percentage of a first total time of the first content that has elapsed;
   determining a second percentage of a second total time of the second content that has elapsed;
   ranking the search results, wherein the ranking comprises ranking the first content of a first classification in proportion to the first percentage and ranking the second content of a second classification in inverse proportion to the second percentage; and
   causing a linear media content that is ranked highest in the search results to be recorded in response to selection of on demand media content from the search results.

2. The method of claim 1, further comprising:
   increasing a rank of a live sporting event included in the search results as the first percentage increases; and
   decreasing a rank of a movie included in the search results as the second percentage decreases.

3. The method of claim 1, wherein the first content comprises linear video programming, and the first classification comprises a live sporting event.

4. The method of claim 1, wherein the second content comprises linear video programming, and the second classification comprises a movie or sitcom.

5. The method of claim 1, wherein the ranking further comprises ranking on demand media content in inverse proportion to an amount of time until on demand access to the on demand media content expires.

6. The method of claim 1, further comprising outputting, to a display device, the search results and status information, wherein the status information comprises the first percentage.

7. The method of claim 1, further comprising outputting, to a display device, the search results and status information, wherein the status information comprises an amount of time from a start of the first content to a time of the outputting.

8. The method of claim 1, wherein the ranking the search results comprises ranking third content based on a first priority level associated with a first segment of the third content, the first segment being output at a time at which the search request is received.

9. The method of claim 8, further comprising:
   receiving a second search request;
   responsive to the second search request, using the listing information to generate second search results indicating the third content; and
   ranking the second search results, wherein the ranking the second search results comprises ranking the third content based on a second priority level different from the first priority level and associated with a second segment of the third content, the second segment being output at a time at which the second search request is received and being different from the first segment.

10. The method of claim 8, further comprising:
    using a slider bar to set the first priority level for the first segment of the third content.

11. A method, comprising:
    storing, by a computing system, listing information;
    receiving a search request;
    generating search results based on the listing information and the search request;

ranking the search results by weighting a percentage of a total time of content that has elapsed differently for different classes of the content; and causing a linear media content that is ranked highest in the search results to be recorded in response to selection of on demand media content from the search results.

12. The method of claim 11, wherein the generating the search results comprises performing a search for content matching a search criterion entered by a user and provided within the search request.

13. The method of claim 11, wherein the ranking the search results comprises weighting a video of a live event in proportion to a percentage of a total time of the video of the live event that has elapsed.

14. The method of claim 11, wherein the ranking the search results comprises applying greater weights to videos of live events as the live events approach their respective end.

15. The method of claim 11, wherein the ranking the search results comprises weighting a movie in inverse proportion to a percentage of a total time of the movie that has elapsed.

16. The method of claim 11, wherein the ranking the search results comprises applying lower weights to movies as the movies approach their respective end.

* * * * *